United States Patent
Tong

(10) Patent No.: US 12,168,200 B2
(45) Date of Patent: Dec. 17, 2024

(54) DESULFURIZATION AND DENITRATION METHOD USING CHLORINE DIOXIDE

(71) Applicant: Environment Sustainable System Engineering Technology Co., Ltd., Beijing (CN)

(72) Inventor: Shanghui Tong, Beijing (CN)

(73) Assignee: Environment Sustainable System Engineering Technology Co., Ltd., Beijing (CN)

( * ) Notice: Subject to any disclaimer, the term of this patent is extended or adjusted under 35 U.S.C. 154(b) by 421 days.

(21) Appl. No.: 17/628,798

(22) PCT Filed: Mar. 20, 2020

(86) PCT No.: PCT/CN2020/080338
§ 371 (c)(1),
(2) Date: Jan. 20, 2022

(87) PCT Pub. No.: WO2021/134926
PCT Pub. Date: Jul. 8, 2021

(65) Prior Publication Data
US 2022/0274057 A1   Sep. 1, 2022

(30) Foreign Application Priority Data

Dec. 30, 2019 (CN) .......................... 201911394319.6

(51) Int. Cl.
*B01D 53/22* (2006.01)
*B01D 53/60* (2006.01)
*B01D 53/75* (2006.01)
*B01D 53/78* (2006.01)

(52) U.S. Cl.
CPC ............ *B01D 53/60* (2013.01); *B01D 53/75* (2013.01); *B01D 53/78* (2013.01); *B01D 2251/108* (2013.01); *B01D 2257/302* (2013.01); *B01D 2257/404* (2013.01); *B01D 2258/0283* (2013.01)

(58) Field of Classification Search
CPC .. B01D 2251/108; B01D 53/78; B01D 53/60; B01D 53/75; B01D 2257/404; B01D 2258/0283; B01D 2257/302
See application file for complete search history.

(56) References Cited

U.S. PATENT DOCUMENTS

| | | | | |
|---|---|---|---|---|
| 4,285,923 A | * | 8/1981 | Bean | C01B 21/50 423/385 |
| 5,246,597 A | * | 9/1993 | Jenson | C09K 8/54 210/759 |
| 5,366,714 A | * | 11/1994 | Bigauskas | C01B 11/026 423/478 |
| 6,039,783 A | * | 3/2000 | Lueck | B01D 53/56 423/393 |
| 6,641,638 B1 | * | 11/2003 | Lueck | C05C 5/02 423/393 |
| 8,425,866 B2 | * | 4/2013 | Parrish | B01D 53/507 423/210 |
| 2005/0214187 A1 | | 9/2005 | Johnson | |
| 2006/0239878 A1 | * | 10/2006 | Lee | B01D 53/60 423/210 |
| 2018/0140997 A1 | * | 5/2018 | Richardson | B01F 25/31332 |
| 2023/0150846 A1 | * | 5/2023 | Briscoe | C01B 11/026 210/748.2 |

FOREIGN PATENT DOCUMENTS

| | | |
|---|---|---|
| CN | 101309740 A | 11/2008 |
| CN | 103990362 A | 8/2014 |
| CN | 203750390 U | 8/2014 |
| CN | 104028103 A | 9/2014 |
| CN | 106621712 A | 5/2017 |
| CN | 106975337 A | 7/2017 |
| CN | 107970769 A | 5/2018 |
| CN | 209530493 U | 10/2019 |

OTHER PUBLICATIONS

Fernandez "SO2 reaction with Ca(OH)2 at medium temperatures (300±425oC):Kinetic behaviour" Chemical Engineering Science, vol. 53, No. 10, pp. 1869-1881, 1998 (Year: 1998).*
Machine translation CN103990362 (A) 15 pages, 2014 (Year: 2014).*
Machine translation CN107970769 (A) 16 pages, 2018 (Year: 2018).*
International Search Report issued in Application No. PCT/CN2020/080338, mailed on Oct. 13, 2020 (4 pages).
Written Opinion issued in Application No. PCT/CN2020/080338, mailed on Oct. 13, 2020 (3 pages).

* cited by examiner

*Primary Examiner* — Anthony R Shumate
(74) *Attorney, Agent, or Firm* — Osha Bergman Watanabe & Burton LLP

(57) ABSTRACT

A desulfurization and denitration method includes adding an aqueous solution of a chlorate, an aqueous solution of a peroxide, and an aqueous solution of sulfuric acid to a chlorine dioxide generator to obtain gaseous chlorine dioxide, and mixing the gaseous chlorine dioxide with air to obtain a mixed gas. The gaseous chlorine dioxide is 4-10 vol % of the mixed gas. The method includes letting the mixed gas come into contact with a flue gas to obtain an oxidized flue gas. A molar ratio of the gaseous chlorine dioxide in the mixed gas to nitric oxide in the flue gas is 1-1.8. The final step includes passing the oxidized flue gas to the desulfurization and denitration tower and mixing the oxidized flue gas with a spray of an alkaline absorbent dry powder, and spraying water into the desulfurization and denitration tower to obtain a desulfurized and denitrated flue gas.

9 Claims, No Drawings

DESULFURIZATION AND DENITRATION METHOD USING CHLORINE DIOXIDE

TECHNICAL FIELD OF THE DISCLOSURE

The present disclosure relates to a desulfurization and denitration method using chlorine dioxide.

BACKGROUND OF THE DISCLOSURE

Flue gases from coal-fired facilities comprise a large amount of deleterious gases such as sulfur dioxide and nitrogen oxides, which have caused irreversible damage to the atmospheric environment, including acid rain and photochemical smog. The effective removal of sulfur dioxide and nitrogen oxides in flue gases has always been a research focus of researchers, and the removal of NO has especially been a research difficulty.

In the denitration of a flue gas, it is necessary to first oxidize NO in the flue gas to high-valent nitrogen oxides. This oxidation process needs the participation of an oxidant. Chlorine dioxide, among gaseous oxidants, has attracted much attention due to its strong oxidizing property, and has been widely used in denitrification projects over recent years. However, gaseous chlorine dioxide is unstable in nature, prone to explosion and difficult to store and transport.

CN106621712A discloses a method for desulfurizing and denitrating flue gases. This method involves a strong oxidizing system in which NO in the flue gas is oxidized by ozone prepared by an ozone generator and becomes high-valent nitrogen oxides. The high-valent nitrogen oxides and sulfur dioxide are integratedly removed by an absorbent liquid so that flue gas is purified. The efficiency at which ozone oxidizes NO is high, thus bringing about a significant removal effect, but the ozone generator is expensive and takes up a large area, thus incurring high initial-stage costs.

CN104028103A discloses a method that catalytically oxidizes a flue gas by means of liquid-phase chlorine dioxide while desulfurizing and denitrating the flue gas at the same time. The aqueous solution of chlorine dioxide (at a concentration of 0.0015-0.015 mol/L), generated by a chlorine dioxide preparation device, is sprayed in an absorption tower to oxidize NO in the flue gas. The aqueous solution of chlorine dioxide, however, is at such a low concentration that it has to be sprayed in a large quantity. This causes an increase in the volume of the absorption tower and in the initial-stage investment in equipment and adds to difficulties in carrying out the process.

CN106975337A discloses a process that integrates oxidation by means of gaseous chlorine dioxide with desulfurization and denitration. In this process, the step of oxidation using chlorine dioxide and the step of desulfurization and denitration both occur in an absorption tower. Specifically, after going through a desulfurizer spray, the flue gas undergoes a chlorine dioxide spray generated by a gasification spray conduit so that NO is oxidized to high-valent nitrogen oxides. Thereafter, the high-valent nitrogen oxides are removed by a denitration agent spray above the partition board. However, the capability of chlorine dioxide to react with the desulfurizer not only causes a waste of chlorine dioxide and the desulfurizer, but affects the desulfurization efficiency as well.

In view of the above, it is vital to develop a low energy-consumption, high-efficiency desulfurization and denitration process making use of chlorine dioxide.

SUMMARY OF THE DISCLOSURE

One objective of the present disclosure is to provide a desulfurization and denitration method using chlorine dioxide synthesized in situ. The method is simple and highly efficient in desulfurization and denitration and incurs low costs.

To accomplish the objective, the present disclosure takes technical solutions described below.

The present disclosure provides a desulfurization and denitration method using chlorine dioxide, which comprises:

step (1) of adding an aqueous solution of a chlorate, an aqueous solution of a peroxide, and an aqueous solution of sulfuric acid to a chlorine dioxide generator for a reaction to obtain gaseous chlorine dioxide, and mixing the gaseous chlorine dioxide with air to obtain a mixed gas, wherein the gaseous chlorine dioxide accounts for 4-10 vol % of the mixed gas;

step (2) of letting the mixed gas come into contact with a flue gas in a flue gas conduit before the flue gas enters a desulfurization and denitration tower, to obtain an oxidized flue gas, wherein a molar ratio of the gaseous chlorine dioxide in the mixed gas passed to the flue gas conduit per unit time to nitric oxide in the flue gas passed to the flue gas conduit per unit time is 1-1.8; and step (3) of passing the oxidized flue gas to the desulfurization and denitration tower and mixing the oxidized flue gas with a spray of an alkaline absorbent dry powder, and spraying water into the desulfurization and denitration tower to obtain a desulfurized and denitrated flue gas.

According to the method of the present disclosure, it is preferable in step (1) that the aqueous solution of a chlorate is an aqueous solution of sodium chlorate having a concentration of 15-40 wt %, and the aqueous solution of sulfuric acid has a concentration of 30-60 wt %.

According to the method of the present disclosure, it is preferable in step (1) that the aqueous solution of a peroxide is an aqueous solution of hydrogen peroxide having a concentration of 25-28 wt % or 34-38 wt %.

According to the method of the present disclosure, it is preferable in step (1) that the chlorate, hydrogen peroxide and sulfuric acid added to the chlorine dioxide generator are at a molar ratio of 1:0.55-1:0.5-1, and the chlorine dioxide generator is at a temperature for the reaction of 40-90° C.

According to the method of the present disclosure, it is preferable in step (2) that the flue gas entering the flue gas conduit has a sulfur content of 600-4000 mg/Nm$^3$, a nitrogen content of 200-600 mg/Nm$^3$, an oxygen content of 5-23 wt %, and a moisture content of 5-12 wt %.

According to the method of the present disclosure, it is preferable in step (2) that the flue gas has a flow rate of 6-15 m/s in the flue gas conduit, and a duration of letting the mixed gas come into contact with the flue gas in the flue gas conduit before the flue gas enters the desulfurization and denitration tower is 1-3 s.

According to the method of the present disclosure, it is preferable in step (3) that the alkaline absorbent dry powder is calcium oxide and/or calcium hydroxide and has a particle size of 150-350 mesh.

According to the method of the present disclosure, it is preferable in step (3) that the oxidized flue gas has a flow rate of 1-7 m/s in the desulfurization and denitration tower, and a duration of contact between the oxidized flue gas and the alkaline absorbent dry powder in the desulfurization and denitration tower is 2-15 s.

According to the method of the present disclosure, it is preferable in step (3) that a molar ratio Ca/S of elemental calcium contained in the alkaline absorbent dry powder passed to the desulfurization and denitration tower per unit time to elemental sulfur contained in the flue gas passed to the desulfurization and denitration tower per unit time is 1.1-1.5.

According to the method of the present disclosure, it is preferable in step (3) that a molar ratio Ca/N of elemental calcium contained in the alkaline absorbent dry powder passed to the desulfurization and denitration tower per unit time to elemental nitrogen contained in the flue gas passed to the desulfurization and denitration tower per unit time is 0.5-1.5.

The desulfurization and denitration method of the present disclosure uses gaseous chlorine dioxide synthesized in situ as an oxidant for the desulfurization and denitration and achieves a desulfurization efficiency of more than 99% and a denitration efficiency of more than 91%. Also, since chlorine dioxide is used in gas form in the specific process, less chlorine dioxide is consumed, and lower costs are incurred.

DETAIL DESCRIPTION OF THE DISCLOSURE

The present disclosure will be further explained by means of embodiments, but the protection scope of the present disclosure is not limited thereto.

The present disclosure provides an integrated CFB flue gas desulfurization and denitration process in which chlorine dioxide prepared from sodium chlorate serves as an oxidant, and subsequently, a flue gas is combined with a calcium-based absorbent. The reactions involved in the process are as follows:

(1) Preparation of gaseous chlorine dioxide
$2NaClO_3 + H_2O_2 + H_2SO_4 \rightarrow 2ClO_2 + Na_2SO_4 + H_2O + O_2$ (main reaction)

(2) Oxidation of nitric oxide
$2ClO_2 + 5NO + H_2O \rightarrow 2HCl + 5NO_2$ (main reaction)
$2ClO_2 + 4NO \rightarrow Cl_2 + 4NO_2$ (side reaction)
$2NO_2 + H_2O \rightarrow HNO_2 + HNO_3$ (side reaction)
$5HNO_2 + 2ClO_2 + H_2O \rightarrow 5HNO_3 + 2HCl$ (side reaction)

(3) Denitration of flue gas
$NO + NO_2 + Ca(OH)_2 \rightarrow Ca(NO_2)_2 + H_2O$ (main reaction)
$Ca(NO_2)_2 + O_2 \rightarrow Ca(NO_3)_2$ (side reaction)
$HNO_2 + HNO_3 + 1/2O_2 + Ca(OH)_2 \rightarrow Ca(NO_3)_2 + 2H_2O$ (side reaction)
$4ClO_2 + 2Ca(OH)_2 \rightarrow Ca(OH)_2 \rightarrow Ca(ClO_3)_2 + 2H_2O$ (side reaction)
$2Cl_2 + 2Ca(OH)_2 \rightarrow CaCl_2 + Ca(ClO)_2 + 2H_2O$ (side reaction)

(4) Desulfurization of flue gas
$SO_2 + H_2O \rightarrow H_2SO_3$ (main reaction)
$3H_2SO_3 + 2Ca(OH)_2 \rightarrow Ca(HSO_3)_2 + CaSO_3 + 4H_2O$ (main reaction)
$Ca(HSO_3)_2 + 2CaSO_3 + 2O_2 + Ca(OH)_2 \rightarrow 4CaSO_4 + 2H_2O$ (main reaction)

The desulfurization and denitration method of the present disclosure comprises the following steps: (1) preparation of gaseous chlorine dioxide; (2) oxidation of a flue gas; and (3) desulfurization and dentitration. The following is a detailed description of the method of present disclosure.

<Preparation of Gaseous Chlorine Dioxide>

An aqueous solution of a chlorate, an aqueous solution of a peroxide and an aqueous solution of sulfuric acid are reacted in a chlorine dioxide generator to obtain gaseous chlorine dioxide. The gaseous chlorine dioxide is mixed with air to obtain a mixed gas. In the present disclosure, the gaseous chlorine dioxide may account for 4-10 vol %, preferably 5-8 vol %, and more preferably 7-8 vol % of the mixed gas. Mixing the gaseous chlorine dioxide with air at a ratio falling within the ranges described above increases the rate of conversion of nitric oxide in addition to ensuring a safe production.

The aqueous solution of a peroxide may be an aqueous solution of hydrogen peroxide. According to one embodiment of the present disclosure, the concentration of hydrogen peroxide in the aqueous solution of hydrogen peroxide may be 25-28 wt %, preferably 26-28 wt %, and more preferably 27-28 wt %. According to another embodiment of the present disclosure, the concentration of hydrogen peroxide in the aqueous solution of hydrogen peroxide may also be 34-38 wt %, preferably 34.5-37 wt %, and more preferably 35-36 wt %. The employment of an aqueous solution of a peroxide having a concentration falling within the ranges described above makes it possible to control the reaction rate and produce gaseous chlorine dioxide with greater safety.

The chlorate may be one of sodium chlorate, potassium chlorate, and magnesium chlorate, preferably one of sodium chlorate and potassium chlorate, and more preferably sodium chlorate. Sodium chlorate in the aqueous solution of the chlorate, hydrogen peroxide in the aqueous solution of hydrogen peroxide and sulfuric acid in the aqueous solution of sulfuric acid in the chlorine dioxide generator are at a molar ratio of 1:0.55-1:0.5-1, preferably 1:0.6-1:0.6-1, and more preferably 1:0.7-1:0.7-1. The chlorine dioxide generator is at a temperature for the reaction of 50-90° C., preferably 60-80° C., and more preferably 70-80° C. The employment of a molar ratio and reaction temperature that fall within the ranges described above enables chlorine dioxide to be generated at a controlled rate and in greater safety and the generated gaseous chlorine dioxide to be purer.

The gaseous chlorine dioxide produced by the chlorine dioxide generator and air passed to the chlorine dioxide generator are mixed, resulting in a mixed gas. The mixed gas is output by an induced draft fan.

<Oxidation of Flue Gas>

The mixed gas is caused to come into contact with a flue gas in a flue gas conduit before the flue gas enters a desulfurization and denitration tower, to obtain an oxidized flue gas. In the present disclosure, a molar ratio of chlorine dioxide in the mixed gas passed to the flue gas conduit per unit time to nitric oxide in the flue gas in the flue gas conduit may be 1-1.8, preferably 1.1-1.6, and more preferably 1.2-1.5. The employment of a molar ratio falling within the ranges described above makes it possible to increase the rate of oxidation of nitric oxide in addition to saving chlorine dioxide.

According to one embodiment of the present disclosure, the gaseous chlorine dioxide produced by the chlorine dioxide generator and air added thereto are mixed therein, resulting in a mixed gas. The mixed gas is output by an induced draft fan and then input to a flue gas conduit, where the mixed gas comes into contact with the flue gas. The molar ratio of chlorine dioxide in the mixed gas passed to the flue gas conduit per unit time to nitric oxide in the flue gas is 1.2-1.5.

The flue gas entering the flue gas conduit may have a sulfur content (i.e., a sulfur dioxide content) of 600-4000 mg/Nm³, preferably 1000-3000 mg/Nm³, and more preferably 1500-2500 mg/Nm³. The flue gas entering the flue gas conduit may have a nitrogen content (i.e., a nitric oxide content) of 200-600 mg/Nm³, preferably 200-400 mg/Nm³, and more preferably 220-250 mg/Nm³. The flue gas entering the flue gas conduit may have an oxygen content of 5-23 wt %, preferably 10-20 wt %, and more preferably 15-20 wt %.

The flue gas entering the flue gas conduit may have a moisture content of 5-12% by weight, preferably 8-12% by weight, and more preferably 10-12% by weight. The employment of a sulfur content, nitrogen content, oxygen content, and moisture content that fall within the ranges described above can help to make the desulfurization and denitration of the flue gas more effective.

In the flue gas conduit, the flue gas may have a flow rate of 6-15 m/s, preferably 8-15 m/s, and more preferably 10-12 m/s. Also, the duration of letting the mixed gas come into contact with the flue gas in the flue gas conduit before the flue gas enters a desulfurization and denitration tower is 1-3 s. Controlling the flow rate of the flue gas such that it falls within the ranges described above ensures not only an appropriate rate of oxidization of nitric oxide in the flue gas but also an appropriate processing rate.

The flue gas may have a dust content of 80-200 mg/Nm$^3$, preferably 100-150 mg/Nm$^3$, and more preferably 120-150 mg/Nm$^3$. According to one embodiment of the present disclosure, the flue gas is subjected to a preliminary dust removal before being passed the flue gas conduit. The present disclosure subjects the flue gas to a preliminary dust removal by an electrostatic precipitator.

<Desulfurization and Dentitration>

In the step of desulfurization and dentitration, the oxidized flue gas is passed to a desulfurization and dentitration tower and mixed therein with a spray of an alkaline absorbent dry powder, and water is sprayed into the desulfurization and denitration tower to obtain a desulfurized and denitrated flue gas.

In the present disclosure, the alkaline absorbent dry powder is calcium oxide and/or calcium hydroxide, preferably calcium oxide and/or calcium hydroxide, and more preferably hydroxide calcium. In the present disclosure, calcium oxide may have a purity of 80-99 wt %, preferably 80-95 wt %, and more preferably 80-90 wt %. Calcium hydroxide may have a purity of 80-99 wt %, preferably 80-95 wt %, and more preferably 80-90 wt %. In the present disclosure, the alkaline absorbent dry powder may have a particle size of 150-350 mesh, preferably 200-350 mesh, and more preferably 200-300 mesh. The employment of an alkaline absorbent having a particle size falling within the ranges described above in the dry absorption makes the desulfurization and denitration more effective.

In the desulfurization and denitration tower, the oxidized flue gas may have a flow rate of 1-7 m/s, preferably 2-5 m/s, and more preferably 3-4 m/s. The duration of contact between the oxidized flue gas and the alkaline absorbent dry powder in the desulfurization and denitration tower may be 2-15 s, preferably 3-12 s, and more preferably 5-10 s.

The molar ratio Ca/S of elemental calcium contained in the alkaline absorbent dry powder passed to the desulfurization and denitration tower per unit time to elemental sulfur contained in the flue gas passed to the desulfurization and denitration tower per unit time may be 1.1-1.5, preferably 1.2-1.5, and more preferably 1.2-1.3. The employment of a molar ratio Ca/S falling within the ranges described above improves the desulfurization efficiency in addition to saving the costs.

The molar ratio Ca/N of elemental calcium contained in the alkaline absorbent dry powder passed to the desulfurization and denitration tower per unit time to elemental nitrogen contained in the flue gas passed to the desulfurization and denitration tower per unit time may be 0.5-1.5, preferably 0.5-1.0, and more preferably 0.6-0.8. The employment of a molar ratio Ca/N falling within the ranges described above improves the denitration efficiency in addition to saving the costs.

At the inlet of the desulfurization and denitration tower, the oxidized flue gas may have a temperature of 110-200° C., preferably 110-180° C., and more preferably 120-150° C.

According to one embodiment of the present disclosure, the desulfurized and denitrated flue gas is dedusted by a bag filter on the top of the desulfurization and denitration tower to become a purified flue gas before being discharged from the chimney. The resultant solid ash is transported to an ash storage tank, or sprayed into the desulfurization and denitration tower to be used once again as the alkaline absorbent dry powder.

Example 1

An aqueous solution of sodium chlorate, an aqueous solution of hydrogen peroxide, and an aqueous solution of sulfuric acid were fed by a metering pump to a chlorine dioxide generator. They reacted therein and generated gaseous chlorine dioxide. In the chlorine dioxide generator, the gaseous chlorine dioxide was mixed with air introduced thereinto, resulting in a mixed gas. The mixed gas was input into a flue gas conduit by an induced draft fan.

After being dedusted by an electrostatic precipitator, a flue gas was passed to the flue gas conduit and came into contact with the mixed gas input by the induced draft fan. Upon the oxidization of nitric oxide in the flue gas to nitrogen oxides, an oxidized flue gas was obtained.

The oxidized flue gas was passed to a desulfurization and denitration tower and mixed with a spray of dry calcium hydroxide powder therein. Water was sprayed into the desulfurization and denitration tower to remove nitrogen oxides and sulfur dioxide in the oxidized flue gas, resulting in a desulfurized and denitrated flue gas.

The method described above was applied to a 90 m$^2$ sintering machine for a desulfurization and denitration project, and the operating parameters are listed in Table 1. The desulfurized and denitrated flue gas was dedusted by a bag filter at the top of the desulfurization and denitration tower. The purified flue gas obtained in this example has parameters shown in Table 2.

TABLE 1

| Parameters | Values | Units |
|---|---|---|
| Flow rate of flue gas at inlet of flue gas conduit (working conditions) | 575824 | m$^3$/h |
| Flow rate of flue gas at inlet of flue gas conduit (standard conditions) | 400000 | Nm$^3$/h |
| Temperature of oxidized flue gas at inlet of desulfurization and denitration tower | 120 | ° C. |
| SO$_2$ content in flue gas | 2300 | mg/Nm$^3$ |
| NO content in flue gas | 230 | mg/Nm$^3$ |
| Moisture content in flue gas | 10 | % |
| Oxygen content in flue gas | 18 | % |
| Dust content in flue gas | 120 | mg/Nm$^3$ |
| Flow rate of flue gas in flue gas conduit | 12 | m/s |
| Flow rate of oxidized flue gas in desulfurization and denitration tower | 3.8 | m/s |
| Aqueous solution of sodium chlorate | 30 | wt % |
| Aqueous solution of hydrogen peroxide | 27.5 | wt % |
| Aqueous solution of sulfuric acid | 60 | wt % |
| Sodium chlorate: hydrogen peroxide: sulfuric acid (molar ratio) | 1:0.7:0.7 | — |

TABLE 1-continued

| Parameters | Values | Units |
|---|---|---|
| Temperature of chlorine dioxide generator | 45 | ° C. |
| Percentage by volume of chlorine dioxide in mixed gas | 8 | vol % |
| Molar ratio ClO$_2$/NO in flue gas conduit | 1.3 | — |
| Molar ratio Ca/S | 1.3 | — |
| Molar ratio Ca/N | 0.6 | — |
| Purity of dry calcium hydroxide powder | 90 | wt % |
| Particle size of dry calcium hydroxide powder | 200-300 | mesh |
| Amount of dry calcium hydroxide powder | 1688 | kg/h |

TABLE 2

| Items | Values | Units |
|---|---|---|
| Desulfurization efficiency | 99.8 | % |
| Denitration efficiency | 95.2 | % |

Comparative Example 1

In this comparative example, the operating parameters were the same as those in Example 1 except those listed in Table 3. The purified flue gas obtained in this comparative example has parameters shown in Table 4.

TABLE 3

| Parameters | Values | Units |
|---|---|---|
| Molar ratio ClO$_2$/NO in flue gas conduit | 0.7 | — |

TABLE 4

| Items | Values | Units |
|---|---|---|
| Desulfurization efficiency | 99.2 | % |
| Denitration efficiency | 89.6 | % |

Comparative Example 2

In this comparative example, the operating parameters were the same as those in Example 1 except those listed in Table 5. The purified flue gas obtained in this comparative example has parameters shown in Table 6.

TABLE 5

| Parameters | Values | Units |
|---|---|---|
| Molar ratio ClO$_2$/NO in flue gas conduit | 2 | — |

TABLE 6

| Items | Values | Units |
|---|---|---|
| Exhaust temperature | 40 | ° C. |
| Desulfurization efficiency | 99.5 | % |
| Denitration efficiency | 93.6 | % |

The present disclosure is not limited by the above embodiments. Any variation, modification and replacement to the disclosed embodiments which are apparent to those skilled in the art and do not depart from the essence of the present disclosure fall in the scope of the present disclosure.

What is claimed is:

1. A desulfurization and denitration method using chlorine dioxide, which comprises:
   step (1) of adding an aqueous solution of a chlorate, an aqueous solution of a peroxide, and an aqueous solution of sulfuric acid to a chlorine dioxide generator for a reaction to obtain gaseous chlorine dioxide, and mixing the gaseous chlorine dioxide with air to obtain a mixed gas, wherein the gaseous chlorine dioxide accounts for 4-10 vol % of the mixed gas;
   step (2) of letting the mixed gas come into contact with a flue gas in a flue gas conduit before the flue gas enters a desulfurization and denitration tower, to obtain an oxidized flue gas, wherein a molar ratio of the gaseous chlorine dioxide in the mixed gas passed to the flue gas conduit per unit time to nitric oxide in the flue gas passed to the flue gas conduit per unit time is 1-1.8; and
   step (3) of passing the oxidized flue gas to the desulfurization and denitration tower and mixing the oxidized flue gas with a spray of an alkaline absorbent dry powder, and spraying water into the desulfurization and denitration tower to obtain a desulfurized and denitrated flue gas;
   wherein in step (2), the flue gas has a flow rate of 6-15 m/s in the flue gas conduit, and a duration of letting the mixed gas come into contact with the flue gas in the flue gas conduit before the flue gas enters the desulfurization and denitration tower is 1-3s.

2. The method according to claim 1, wherein in step (1), the aqueous solution of a chlorate is an aqueous solution of sodium chlorate having a concentration of 15-40 wt %, and the aqueous solution of sulfuric acid has a concentration of 30-60 wt %.

3. The method according to claim 2, wherein in step (1), the aqueous solution of a peroxide is an aqueous solution of hydrogen peroxide having a concentration of 25-28 wt % or 34-38 wt %.

4. The method according to claim 3, wherein in step (1), a molar ratio of sodium chlorate in the aqueous solution of the chlorate, hydrogen peroxide in the aqueous solution of hydrogen peroxide and sulfuric acid in the aqueous solution of sulfuric acid is 1:(0.55-1):(0.5-1), and the chlorine dioxide generator is at a temperature for the reaction of 40-90° C.

5. The method according to claim 1, wherein in step (2), the flue gas entering the flue gas conduit has a sulfur content of 600-4000 mg/Nm$^3$, a nitrogen content of 200-600 mg/Nm$^3$, an oxygen content of 5-23 wt %, and a moisture content of 5-12 wt %.

6. The method according to claim 1, wherein in step (3), the alkaline absorbent dry powder is calcium oxide and/or calcium hydroxide, and has a particle size of 150-350 mesh.

7. The method according to claim 1, wherein in step (3), the oxidized flue gas has a flow rate of 1-7 m/s in the desulfurization and denitration tower, and a duration of contact between the oxidized flue gas and the alkaline absorbent dry powder in the desulfurization and denitration tower is 2-15 s.

8. The method according to claim 6, wherein in step (3), a molar ratio Ca/S of elemental calcium contained in the alkaline absorbent dry powder passed to the desulfurization and denitration tower per unit time to elemental sulfur contained in the flue gas passed to the desulfurization and denitration tower per unit time is 1.1-1.5.

9. The method according to claim 8, wherein in step (3), a molar ratio Ca/N of elemental calcium contained in the alkaline absorbent dry powder passed to the desulfurization and denitration tower per unit time to elemental nitrogen contained in the flue gas passed to the desulfurization and denitration tower per unit time is 0.5-1.5.

\* \* \* \* \*